United States Patent
Li et al.

(10) Patent No.: US 11,875,811 B2
(45) Date of Patent: Jan. 16, 2024

(54) INPUT DEVICE ACTIVATION NOISE SUPPRESSION

(71) Applicant: Lenovo (United States) Inc., Morrisville, NC (US)

(72) Inventors: Scott Wentao Li, Cary, NC (US); Robert J. Kapinos, Durham, NC (US); Robert James Norton, Jr., Raleigh, NC (US); Russell Speight Vanblon, Raleigh, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 118 days.

(21) Appl. No.: 17/547,003

(22) Filed: Dec. 9, 2021

(65) Prior Publication Data
US 2023/0186929 A1 Jun. 15, 2023

(51) Int. Cl.
*G10L 21/02* (2013.01)
*G10L 21/0208* (2013.01)
*H04L 65/1083* (2022.01)
*G10L 25/30* (2013.01)
*G10L 25/84* (2013.01)

(52) U.S. Cl.
CPC .......... *G10L 21/0208* (2013.01); *G10L 25/30* (2013.01); *G10L 25/84* (2013.01); *H04L 65/1083* (2013.01)

(58) Field of Classification Search
CPC ................................ G10L 21/02; G10L 11/06
See application file for complete search history.

(56) References Cited

U.S. PATENT DOCUMENTS

| | | | |
|---|---|---|---|
| 10,958,779 B1* | 3/2021 | Rule | H04M 3/54 |
| 2007/0078649 A1* | 4/2007 | Hetherington | G10L 21/0216 704/226 |
| 2008/0118082 A1* | 5/2008 | Seltzer | G10L 21/0208 381/94.1 |
| 2010/0145689 A1* | 6/2010 | Li | G10L 21/0208 704/E11.003 |
| 2017/0194015 A1* | 7/2017 | Buchner | G10L 21/028 |
| 2018/0114518 A1* | 4/2018 | Scanlan | H04R 1/1008 |
| 2020/0349964 A1* | 11/2020 | Godsill | H04R 3/002 |
| 2022/0059112 A1* | 2/2022 | Iyer | G06N 20/00 |
| 2022/0084509 A1* | 3/2022 | Sivaraman | G06N 3/045 |

FOREIGN PATENT DOCUMENTS

| | | | | |
|---|---|---|---|---|
| CN | 111370033 A | * | 7/2020 | |
| CN | 113077806 A | * | 7/2021 | G10L 21/0208 |
| WO | WO-2022067293 A1 | * | 3/2022 | G10L 21/0208 |

* cited by examiner

*Primary Examiner* — Shreyans A Patel
(74) *Attorney, Agent, or Firm* — Schwegman Lundberg & Woessner, P.A.

(57) ABSTRACT

A method includes receiving sound input features representative of sound received during an electronic conference, the sound including voice and input device activation sound, receiving an input event feature indicative of the input device activation, and processing the received sound input features and input event feature via a trained model to identify a stored spectral file to be subtracted from the received sound to suppress the input device activation sound.

19 Claims, 3 Drawing Sheets

INPUT DEVICE ACTIVATION NOISE SUPPRESSION

BACKGROUND

Many personal computer systems utilize keyboards that can make noise which degrades electronic conferences with an audio component. Some Mechanical keyboards are best known for their tactile feedback and better typing experience. They also generate a lot more noise than conventional rubber dome keyboards. In an electronic conferencing situation, the noise generated by key mechanism can be distracting to others electronically coupled to the conference and can be perceived as a nuisance. Other "Clicky" types of devices like mouse may also generate noise that interferes with an audio portion of the electronic conference.

SUMMARY

A method includes receiving sound input features representative of sound received during an electronic conference, the sound including voice and input device activation sound, receiving an input event feature indicative of the input device activation, and processing the received sound input features and input event feature via a trained model to identify a stored spectral file to be subtracted from the received sound to suppress the input device activation sound.

DETAILED DESCRIPTION

Figure 1:
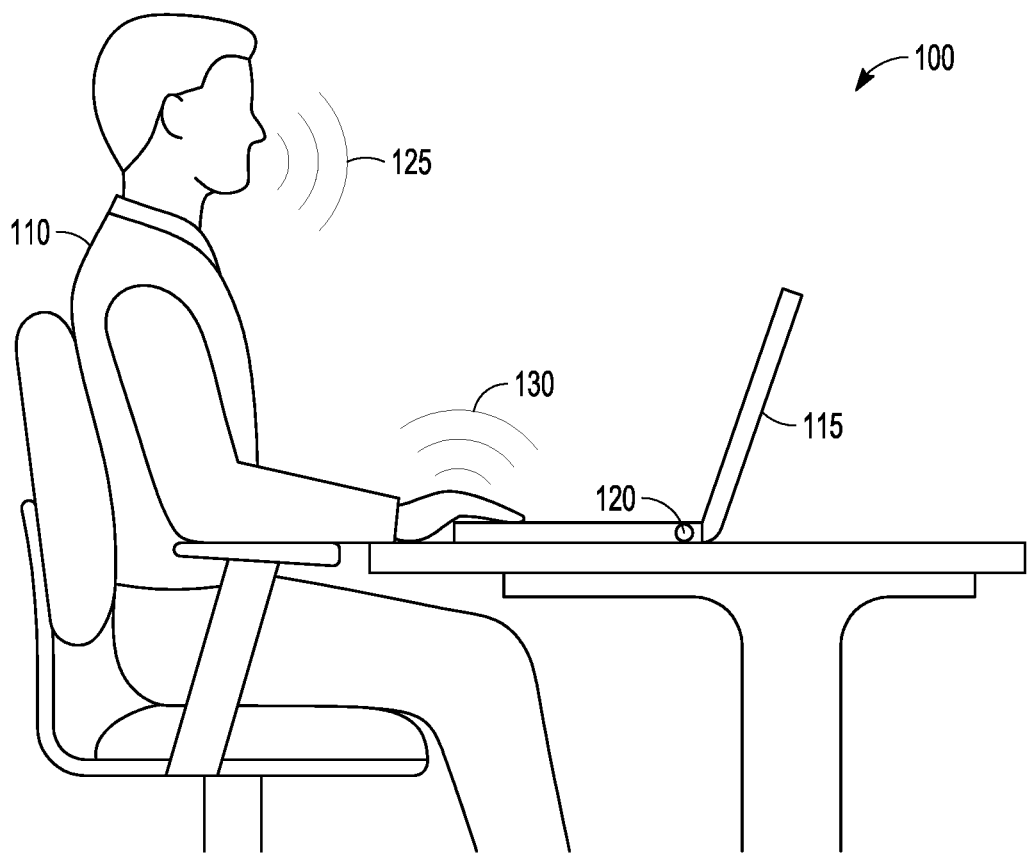
FIG. 1 is a block diagram illustrating a conference session using input activation device noise suppression according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Some laptop computers have a suppress keyboard noise function built in as a tuned bandpass filter in an audio codec/driver stacked based on a laptop keyboard sound profile that is factory tuned to a specific class of keyboard, such as a Thinkpad® keyboard. Since such bandpass filters are tuned for the specific keyboards, they do not work well with other keyboards or other input devices, such as additional keyboards or cursor control devices that emit sound, such as mouse button clicks, touch pad taps, or game controller actuations. Users may also buy other keyboards for use with a computer system for which the bandpass filter are not tuned.

Artificial intelligence, or machine learning based noise suppression provides a more robust method of suppressing input device noise. A trained deep neural network (DNN) may be used to analyze an audio feed to a computer coupled to an electronic conference and filter out the noise while retaining the speech signal of one or more uses of the computer.

This suppression technique is superior to bandpass filters in a conference situation. DNN filters may be very constrained by computational delay windows. In an electronic conference, an audio delay of greater than 300 ms becomes unacceptable. Spurious noise like mechanical keyboard type of devices will strain voice detection and distort human voice in denoised signal.

FIG. 1 is a block diagram illustrating an electronic conference session using input activation device noise suppression generally at 100. A user 110 may be using a laptop computer 115 or other conferencing device having a microphone 120 for receiving sound, including voice sounds 125 from user 110 as well sound 130 from use of an input device such as a keyboard 135 or other type of user input device that may make noise during activation of the input device. Keyboards in particular may make sound 130 during activation that adds to the sound picked up by microphone 120 and may be transmitted to other users on an electronic conference. Noise from any input device may be suppressed during an electronic conference such as conference call, video conference, gaming session, or other type of conference where sound is transmitted.

Figure 2:
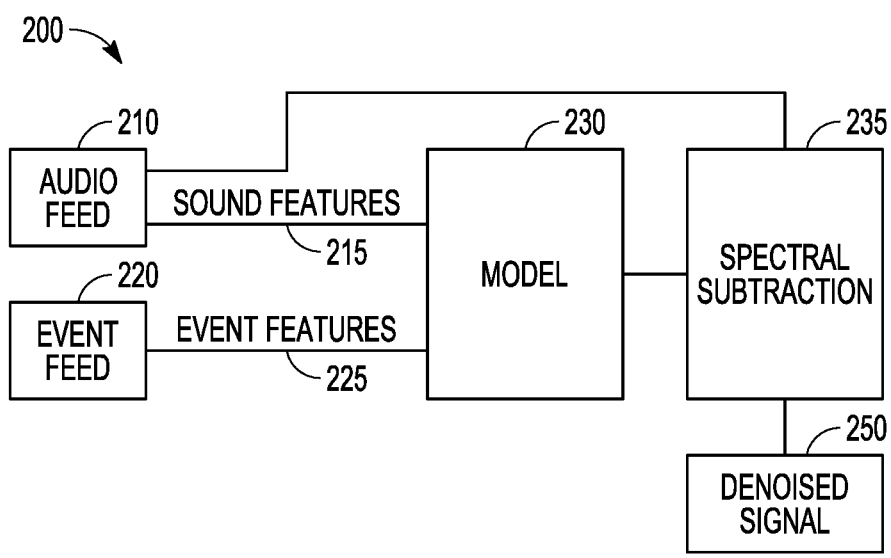
FIG. 2 is a block flow diagram illustration operation of an input activation device noise suppression system according to an example embodiment.

FIG. 2 is a block flow diagram illustration operation of a noise suppression system 200. Noise suppression system 200 may be implemented on the conference device, such as laptop computer 115, or may be implemented in concert with additional processing resources in communication with computer 115, such as server or cloud-based computing resources.

System 200 receives an audio feed 210 that may be converted into an input vector, referred to as sound features 215. Sound features 215 may an octave-based sound feature which is based on power received in each of multiple frequency bands as commonly used in machine learning based voice processing. The sound features will include both voice sounds and input device activation sounds.

An event feed 220 may be converted into event features 225. The event feed 220 may be an event signal received from computer 115 and is representative of a key stroke, mouse click, or other input activation such as a game controller activation in various examples. Since the event feed 220 is electronic, an event may be received more quickly that any sound 130 associated with the activation event due to the different speeds of propagation of sound and electronic or electromagnetic based signals. In one example, the event feed is anonymized such that actual input is not discernable. The event feature itself may be representative of activation or no activation. In further embodiments, the event feature may also indicate the type of device that was activated, as different devices may have many different types of sounds that result from activation. Even different keys of a keyboard may make different sounds. Mouse clicks from different input mouse devices and game controller may also make different sounds on actuation.

The sound feature 215 and event features 225 are received by a noise spectral estimation model 230 that has been trained on training data comprising labeled sound and event features. The labels identify a spectral subtraction corresponding to the sound 130 to be subtracted at 235 from the actual received sound 240. As noted above, the sound 240 includes both voice sound 125 and sound 130 from the input device. In one example, spectral subtraction 240 involves inverting the spectral subtraction and adding it to the received sound 240 to produce a denoised signal 250.

In various embodiments, the various portions of FIG. 2 may be performed by either the computer 115, or in combination with other processing resources, such as cloud or server-based resources. For example, the audio and event feeds may be transmitted to cloud-based resources for further processing, including transmission of the denoised signal 240. In another example, the features may be generated by the computer 115 and transmitted for execution of the model 230 and spectral subtraction 235 by cloud-based resources. Any division of the processing may be used in further examples.

Figure 3:
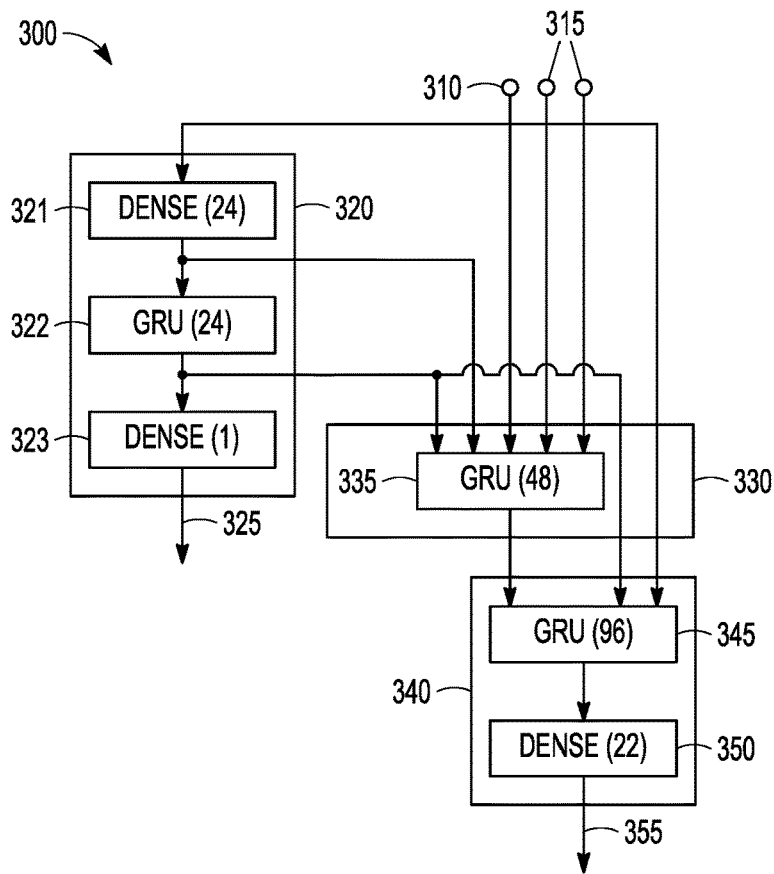
FIG. 3 is a block flow diagram of a system illustrating machine learning models used to suppress input activation noise in an example embodiment.

FIG. 3 is a block flow diagram of a system 300 illustrating machine learning models used in a further example embodiment. Sound features 310 are received by system 300 for processing. As indicated above, the sound features represent sound from a user's device in a conference call. The sound includes both user speech as well as input device sounds. In one example, the sound features have been derived by dividing the frequency range into sets of frequencies called bands. Each band covers a specific range of frequencies. For this reason, a scale of octave bands and one-third octave bands has been used in one example. A band is said to be an octave in width when the upper band frequency is twice the lower band frequency. Such feature vectors are commonly used in sound processing.

System 300 also receives event features 315 that are indicative of the activation of an input device. The event features may also indicate information regarding the type of input device and type of element of the input device that was activated. the event features 315 likely arrive before the sound feature representing the sound created by the activation arrives. This difference in time can be helpful in later processing to minimize actual delays in sound processing such that transmission delays are minimally perceivable if perceivable at all by users.

A voice activity detection model 320 may be used to detect whether or not voice or speech is occurring in the sound features 310. This type of model is well known and frequently used in speech processing. Activity detection model 320 includes a first dense (24) layer 321 feeding a gated recurrent unit (GRU) (24) layer 322 followed by a final dense (1) layer 323 which produces an output 325 indicative of whether or not speech was detected in the sound features 310.

In neural networks, the dense layers feed all outputs from a previous layer to all its neurons. Each neuron providing one output to the next layer. Its the most basic layer in neural networks. A dense layer is basically used for changing the dimensions of the vector, as represented in the parentheses in the text and figures.

The GRU is a gating mechanism used in recurrent neural networks acts like a long short-term memory (LSTM) with a forget gate with fewer parameters than LSTM, as it lacks an output gate. GRU's are commonly used for tasks of polyphonic music modeling, and speech signal modeling.

A noise spectral estimation model 330 receives as input, the output from dense layer 321, GRU 322, as well as the sound features 310 and event features 315. Noise spectral estimation model 330 includes a GRU (48) that identifies a stored spectral file. The identification of the spectral file is provided to a spectral subtraction device, which may be a spectral subtraction model 340 for subtracting the spectral file to minimize perceived sound from input device events. Subtraction may be performed via a GRU (96) 345 and a dense (22) layer to provide an output gain (22) vector to be applied to the sound to suppress the input activation sound.

Such suppression may be performed digitally or in an analog manner depending on the type of sound transmission utilized by the electronic conference.

Figure 4:
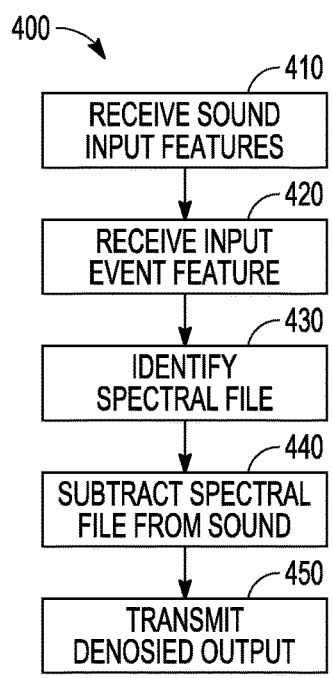
FIG. 4 is a flowchart illustrating a computer implemented method for use in suppressing input activation sounds in an audio signal according to an example embodiment.

FIG. 4 is a flowchart illustrating a computer implemented method 400 of identifying an input device related spectral file for use in suppressing input activation sounds in an audio signal. Method 400 begins at operation 410 by receiving sound input features representative of sound received during an electronic conference. The sound includes both voice sounds of a user captured by an electronic device microphone and input device activation sounds. An input event feature or features are also received at operation 420. The input event feature is indicative of the input device activation.

At operation 430, the received sound input features and input event features are processed via a trained model to identify a stored spectral file to be subtracted from the received sound to suppress the input device activation sound. The stored spectral file comprises sound represented in the time domain or frequency domain. In one example, the stored spectral file is a wavelet and may be stored on a device driver or device memory.

The sound input features in one example are representations of audio power in multiple frequency bands and the stored spectral file comprises representations of audio power in the same multiple frequency bands.

The input event feature may be an indication of a keystroke or mouse click or other sound typically generated by a user operating an input device. In one example, the input event feature includes a keyboard identifier to identify the type of input device, or even type of key that generates the sound. For example, a space bar may generate a sound that is different from the sound of a letter type of key. In addition, further keystroke information may be provided, such as rate of key depression, or even whether or not the key is being depressed or released. Different spectral files may be stored and accessed for different input even features.

The model in one example comprises a deep neural network trained on sound input training features representative of sound received during an electronic conference, the sound including voice and input device activation sound and input activation features.

At operation 540, the spectral file is subtracted from the received sound to produce a denoised output, which may be transmitted at operation 550 by the electronic device being used by the user in the electronic conference.

Transmission of the identified spectral file and the received sound may also be performed for further processing by one or more other computing resources.

In one example, the received sound input features are provided to a voice activity detection model to detect whether or not the sound input features are representative of voice activity, such as speech. The transmission of sound may be muted in response to no voice activity being detected by the voice activity detection model. Other processing, such as spectral file identification and subtraction may also be paused while no voice activity is detected.

In one example, to preserve privacy, the input event feature does not identify a specific input, such as a series of keys activated, from which content, such as actual typed words, can be identified.

Figure 5:
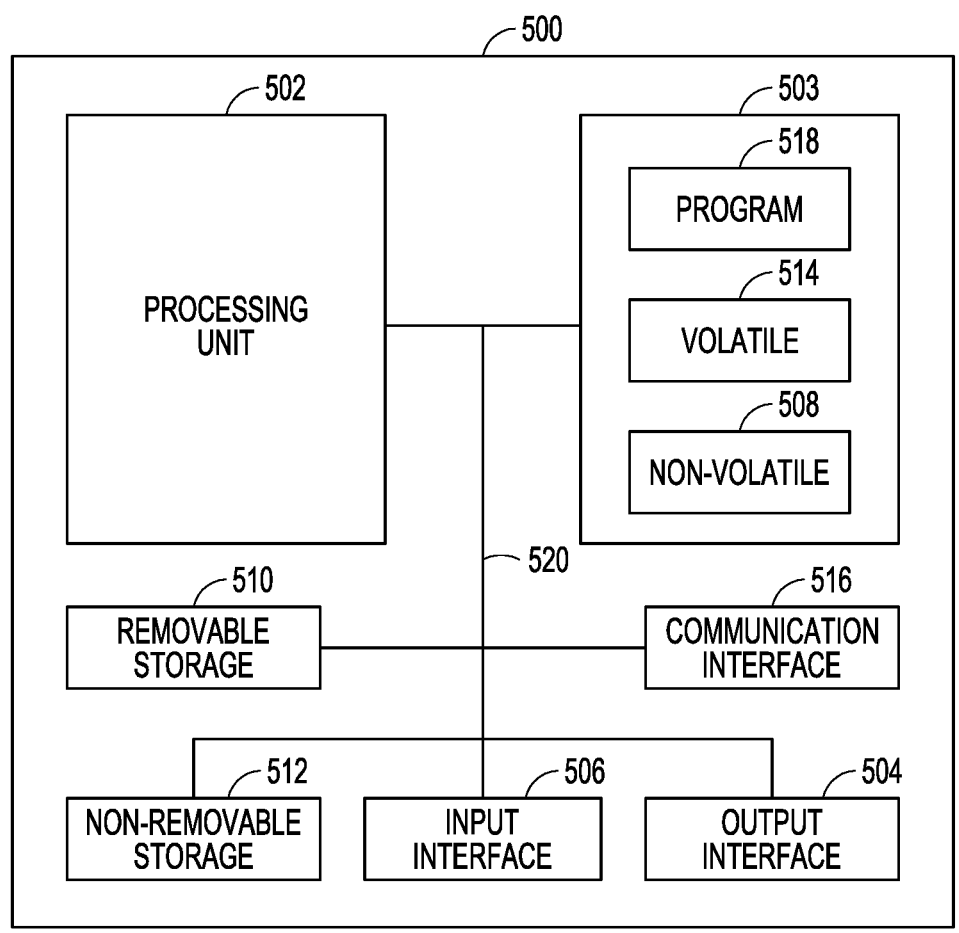
FIG. 5 is a block schematic diagram of a computer system to implement one or more example embodiments.

FIG. 5 is a block schematic diagram of a computer system 500 to suppress input device activation noise from conference calls and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

Examples

1. A method includes receiving sound input features representative of sound received during an electronic conference, the sound including voice and input device activation sound, receiving an input event feature indicative of the input device activation, and processing the received sound input features and input event feature via a trained model to identify a stored spectral file to be subtracted from the received sound to suppress the input device activation sound.

2. The method of example 1 wherein the sound input features include representations of audio power in multiple frequency bands and the stored spectral file comprises representations of audio power in the same multiple frequency bands.

3. The method of any of examples 1-2 wherein the input event feature includes an indication of a keystroke.

4. The method of example 3 wherein the input event feature includes a keyboard identifier.

5. The method of any of examples 1-4 wherein the model comprises a deep neural network trained on sound input training features representative of sound received during an electronic conference, the sound including voice and input device activation sound and input activation features.

6. The method of any of examples 1-5 wherein the stored spectral file comprises sound represented in the time domain or frequency domain.

7. The method of any of examples 1-6 wherein the stored spectral file comprises a wavelet.

8. The method of any of examples 1-7 and further including subtracting the spectral file from the received sound to produce a denoised output and transmitting the denoised output in the electronic conference.

9. The method of any of examples 1-8 and further including transmitting the identified spectral file and the received sound.

10. The method of any of examples 1-9 and further including providing the received sound input features to a voice activity detection model and muting transmission of sound in response to no voice activity being detected.

11. The method of any of examples 1-10 wherein the input event feature does not identify a specific input from which content can be identified.

12. The method of any of examples 1-11 wherein the spectral file is one of multiple spectral files.

13. The method of example 12 wherein the spectral files are stored on a device driver or device memory.

14. A machine-readable storage device has instructions for execution by a processor of a machine to cause the processor to perform operations to perform any of the methods of examples 1-13.

15. A device includes a processor and a memory device coupled to the processor and having a program stored thereon for execution by the processor to perform operations to perform any of the methods of examples 1-13.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   receiving sound input features representative of sound received during an electronic conference, the sound including voice and input device activation sound;
   receiving an input event feature indicative of the input device activation; and
   processing the received sound input features and input event feature via a trained model to identify a stored spectral file to be subtracted from the received sound to suppress the input device activation sound wherein the sound input features comprise representations of audio power in multiple frequency bands and the stored spectral file comprises representations of audio power in the same multiple frequency bands.

2. The method of claim 1 wherein the input event feature comprises an indication of a keystroke.

3. The method of claim 2 wherein the input event feature comprises a keyboard identifier.

4. The method of claim 1 wherein the model comprises a deep neural network trained on sound input training features representative of sound received during an electronic conference, the sound including voice and input device activation sound and input activation features.

5. The method of claim 1 wherein the stored spectral file comprises sound represented in the time domain or frequency domain.

6. The method of claim 1 wherein the stored spectral file comprises a wavelet.

7. The method of claim 1 and further comprising:
   subtracting the spectral file from the received sound to produce a denoised output; and
   transmitting the denoised output in the electronic conference.

8. The method of claim 1 and further comprising transmitting the identified spectral file and the received sound.

9. The method of claim 1 and further comprising:
   providing the received sound input features to a voice activity detection model; and
   muting transmission of sound in response to no voice activity being detected.

10. The method of claim 1 wherein the input event feature does not identify a specific input from which content can be identified.

11. The method of claim 1 wherein the spectral file is one of multiple spectral files.

12. The method of claim 11 wherein the spectral files are stored on a device driver or device memory.

13. A machine-readable storage device having instructions for execution by a processor of a machine to cause the processor to perform operations to perform a method, the operations comprising:
   receiving sound input features representative of sound received during an electronic conference, the sound including voice and input device activation sound;
   receiving an input event feature indicative of the input device activation; and
   processing the received sound input features and input event feature via a trained model to identify a stored spectral file to be subtracted from the received sound to suppress the input device activation sound wherein the sound input features comprise representations of audio power in multiple frequency bands and the stored spectral file comprises representations of audio power in the same multiple frequency bands.

14. The device of claim 13 wherein the input event feature comprises an indication of a keystroke or a keyboard identifier.

15. A device comprising:
a processor; and
a memory device coupled to the processor and having a program stored thereon for execution by the processor to perform operations comprising:
receiving sound input features representative of sound received during an electronic conference, the sound including voice and input device activation sound;
receiving an input event feature indicative of the input device activation; and
processing the received sound input features and input event feature via a trained model to identify a stored spectral file to be subtracted from the received sound to suppress the input device activation sound wherein the sound input features comprise representations of audio power in multiple frequency bands and the stored spectral file comprises representations of audio power in the same multiple frequency bands.

16. The device of claim 15 wherein the input event feature comprises an indication of a keystroke or a keyboard identifier.

17. The device of claim 15 wherein the model comprises a deep neural network trained on sound input training features representative of sound received during an electronic conference, the sound including voice and input device activation sound and input activation features.

18. The device of claim 15 wherein the operations further comprise
subtracting the spectral file from the received sound to produce a denoised output; and
transmitting the denoised output in the electronic conference.

19. The device of claim 15 wherein the operations further comprise transmitting the identified spectral file and the received sound.

* * * * *